(12) United States Patent
Knittl et al.

(10) Patent No.: US 11,299,045 B2
(45) Date of Patent: Apr. 12, 2022

(54) METHOD FOR OPERATING A DISPLAY ARRANGEMENT OF A MOTOR VEHICLE, OPERATOR CONTROL DEVICE AND MOTOR VEHICLE

(71) Applicant: AUDI AG, Ingolstadt (DE)

(72) Inventors: Thomas Knittl, Ingolstadt (DE); Xenia Sichwardt, Ingolstadt (DE); Peter Zeinar, Ingolstadt (DE); Patrik Müller, Gothenburg (SE); Maksymilian Nawka, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 303 days.

(21) Appl. No.: 16/616,582

(22) PCT Filed: May 24, 2018

(86) PCT No.: PCT/EP2018/063610
§ 371 (c)(1),
(2) Date: Nov. 25, 2019

(87) PCT Pub. No.: WO2018/224320
PCT Pub. Date: Dec. 13, 2018

(65) Prior Publication Data
US 2020/0079216 A1 Mar. 12, 2020

(30) Foreign Application Priority Data
Jun. 7, 2017 (DE) ...................... 10 2017 209 562.8

(51) Int. Cl.
*B60K 35/00* (2006.01)
*B60K 37/06* (2006.01)

(52) U.S. Cl.
CPC .............. *B60K 35/00* (2013.01); *B60K 37/06* (2013.01); *B60K 2370/143* (2019.05);
(Continued)

(58) Field of Classification Search
None
See application file for complete search history.

(56) References Cited

U.S. PATENT DOCUMENTS

| 2017/0069240 | A1* | 3/2017 | Bae | H04N 13/346 |
| 2017/0161009 | A1* | 6/2017 | Ogisu | G09G 3/001 |
| 2018/0307405 | A1* | 10/2018 | Dandekar | G06F 3/0482 |

FOREIGN PATENT DOCUMENTS

| CN | 104729519 A | 6/2015 |
| DE | 102004037816 B4 | 3/2005 |

(Continued)

OTHER PUBLICATIONS

German Examination Report dated Apr. 4, 2018 in corresponding German Application No. 102017209562.8; 16 pages; Machine translation attached.

(Continued)

*Primary Examiner* — James J Lee
*Assistant Examiner* — David Hatch
(74) *Attorney, Agent, or Firm* — Maier & Maier, PLLC

(57) ABSTRACT

A method for operating a display arrangement of a motor vehicle, which includes at least two display devices each with a display surface. A visible display content can be shifted here three-dimensionally between two display planes. A detection and evaluation device of an operator control device carries out: acquisition of an operator control action by a touch-sensitive operator control surface, preferably a pulling and/or shifting gesture, and of its extension direction, and, on the basis of the determined extension direction, determination of a data set which describes the display content, as well as determination of a predetermined shift of a virtual image of the display content from one of the display planes to the other of the display planes.

12 Claims, 2 Drawing Sheets

(52) U.S. Cl.
CPC  *B60K 2370/146* (2019.05); *B60K 2370/1531* (2019.05); *B60K 2370/182* (2019.05); *B60K 2370/23* (2019.05)

(56) References Cited

FOREIGN PATENT DOCUMENTS

| | | |
|---|---|---|
| DE | 102004055835 A1 | 2/2006 |
| DE | 102008037060 A1 | 2/2010 |
| DE | 102009038044 A1 | 2/2011 |
| DE | 102014222751 A1 | 5/2016 |
| DE | 102014019122 A1 | 6/2016 |
| EP | 1462297 A2 | 9/2004 |

OTHER PUBLICATIONS

German Examination Report dated Jun. 13, 2018 in corresponding German Application No. 102017209562.8; 8 pages; Machine translation attached.

International Search Report dated Sep. 27, 2018 and Written Opinion in corresponding International Application No. PCT/EP2018/063610; 17 pages; Machine translation attached.

Notification of Transittal of Translation of the International Preliminary Report on Patentability dated Dec. 19, 2019, in connection with corresponding international Application No. PCT/EP2018/063610 (7 pgs).

\* cited by examiner

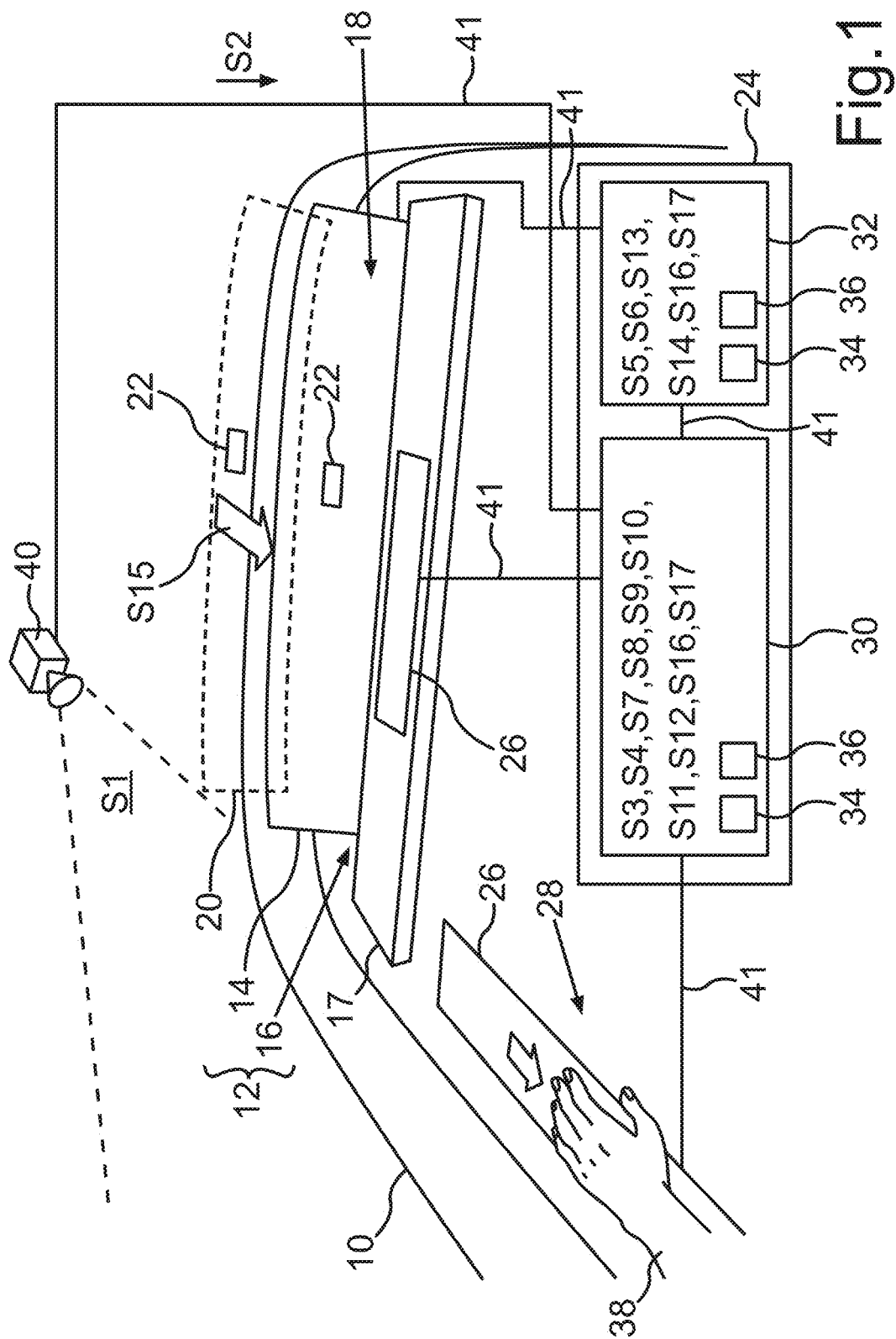

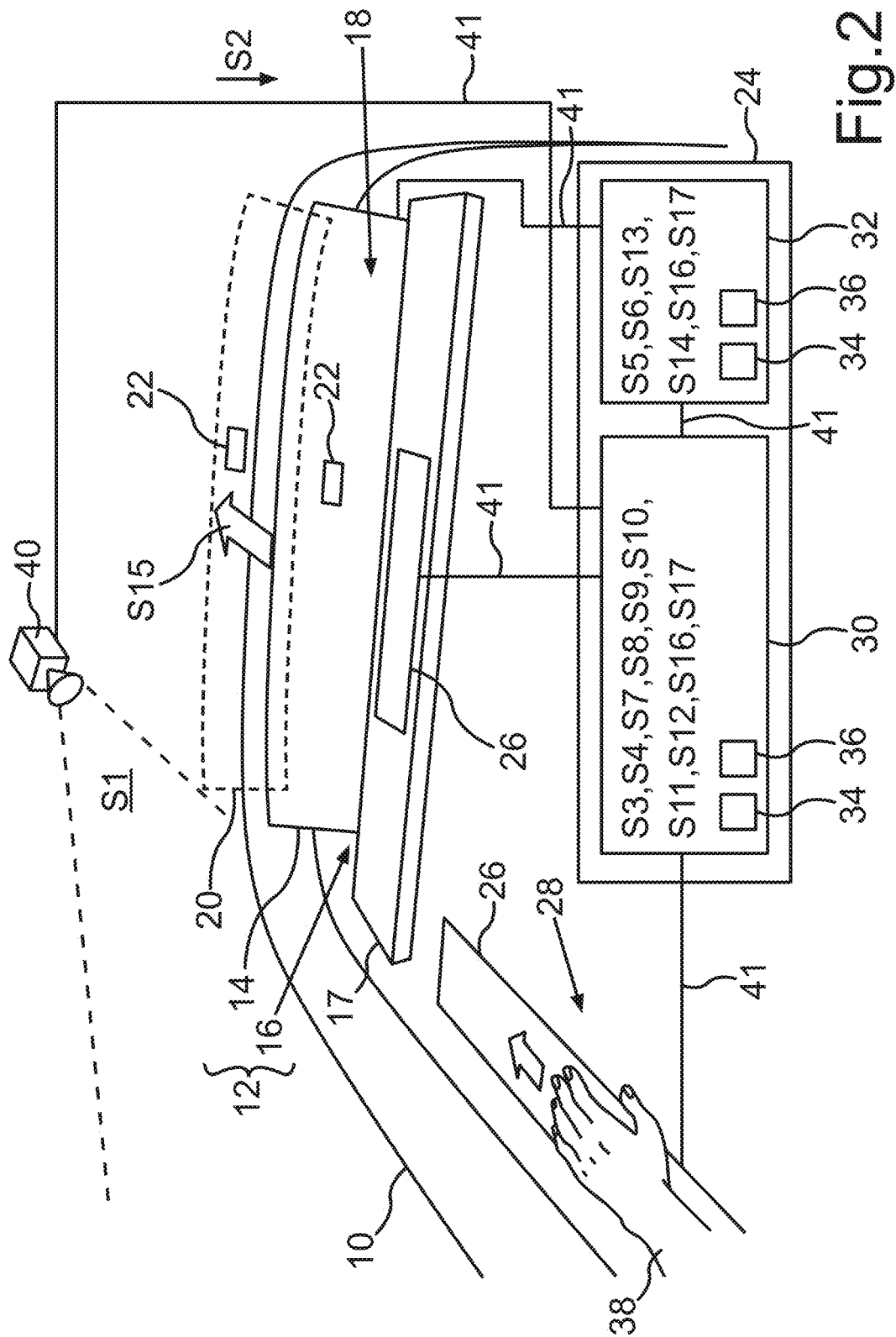

METHOD FOR OPERATING A DISPLAY ARRANGEMENT OF A MOTOR VEHICLE, OPERATOR CONTROL DEVICE AND MOTOR VEHICLE

FIELD

The invention relates to a method for operating a display arrangement of a motor vehicle, which comprises at least two display devices each with a display surface. Here, the at least two display surfaces are arranged with respect to one another in such a manner that a second of the display surfaces is mirrored in a first of the display surfaces, which provides a first display plane, and, consequently, a virtual display plane which is visible from a passenger compartment of the motor vehicle is generated behind the first display plane.

BACKGROUND

Currently, the operation of an infotainment system in the motor vehicle tends to use one-dimensional touch-screen systems in which one interacts directly on the screen. DE 10 2009 038 044 A1 describes, for example, such a touch-sensitive contact surface. Other series systems still use firmly configured turn and press controllers or touch-sensitive operator control surfaces ("touchpad"), with which one can also operate a one-dimensional display.

In the vehicle interior, a novel configuration and alignment of two displays provides an innovative display which creates a 3D-like effect. This is achieved in that the upstream secondary display is mirrored in the main display and thereby enables a second display plane at depth. This means that the mirroring is used in order to generate an additional display plane.

From DE 10 2004 055 835 A1, a display device with at least one display element for representing at least two image planes which can be combined with one another and a method for representing multiple combinable image planes for the display of information are known.

DE 10 2008 037 060 A1 describes a display system with a multilayer display device, whereby at least one first and one second information object can be displayed at the same time on layers located one behind the other.

For the operating of one of the mentioned display arrangements, with the two display devices, that is to say with two displays, for example, in the case of the mirroring through, a virtual additional display plane is set, the user of the motor vehicle can use an additional display device such as 3D goggles, for example.

SUMMARY

An underlying aim of the invention is the provision of an operator control concept for a display arrangement which enables such as a 3D effect.

The aim is achieved by the method according to the invention and the devices according to the invention according to the coordinate claims. Advantageous developments are given by the dependent claims.

The invention is based on the idea of acquisition, with the aid of a touch-sensitive operator control surface, an operator control action of the operator, wherein the operator control action represents a virtual shifting of the display content from one display surface to another display surface. This operator control concept can be implemented not only on a dashboard panel, but also at any site within the motor vehicle, so that an operation of such a display arrangement can also be implemented in piloted motor vehicles without the user having to first move a motor vehicle seat into a certain driver seat position in order to reach an operator control element.

The method according to the invention for operating a display device of a motor vehicle, which comprises at least two display devices each with a display surface, wherein the at least two display surfaces are arranged with respect to one another in such a manner that a second of the display surfaces is mirrored in a first of the display surfaces, which provides a first display plane, and consequently a virtual display plane which is visible from a passenger compartment is generated behind the first display plane, is characterized by the following steps performed by a detection and evaluation device of an operator control device.

A display device is understood to mean here an apparatus or an apparatus component which is designed and configured for outputting image signals and thus for displaying display contents, and which can comprise, for example, a monitor or a TFT monitor. The display surface here is the surface on which the display content is output, and the display plane is the plane in which the output content appears visible. In a first of the two display devices, for example, the display plane can here lie on the display surface. In the case of a second of the at least two display devices, the display plane can be a virtual display plane which appears behind the first display surface.

Detection and evaluation device is understood to mean an apparatus or an apparatus component of an operator control device, that is to say of an operator control apparatus, which is configured for the acquisition of an operator control action and for the detection or determination of an operator control action described by the acquired operator control action, and for this purpose, for example, it can comprise suitable software. Optionally, the detection and evaluation device for the acquisition of the operator control action can have a sensor device which preferably can comprise a sensor for the acquisition of the operator control action.

By the detection and evaluation device, first an acquisition of an operator control action of an operator, preferably of a user of the motor vehicle, occurs, wherein the operator control action comprises a movement of a body part of the operator along an extension direction of a touch-sensitive operator control surface of the operator control device. In other words, the detection and evaluation device detects the operator control action. The touch-sensitive operator control surface can here preferably be designed as a touchpad.

On the basis of the acquired operator control action, a determination of the extension direction on the touch-sensitive operator control surface occurs, and, on the basis of the determined extension direction, a determination of a data set describing a display content, selected by the operator by means of the operator control action and displayed by one of the two display devices occurs, and a determination of a shifting, which is predetermined by the extension direction of the operator control action, of a virtual image of the display content occurs from one of the display planes to the other of the display planes, preferably with respect to a motor vehicle axis, occurs.

For example, the operator can shift a display content represented on the virtual display plane to the front display plane, in that, for example, the operator slides over the exemplary touchpad with the hand along a motor vehicle in longitudinal direction and, for example, in the direction from a motor vehicle front side to a motor vehicle rear.

The method is moreover characterized by the following steps carried out by a control device of the operator control device, wherein a control device is understood to mean an apparatus or an apparatus component for the reception and evaluation of signals, as well as for the generation of control signals. The control device can here be designed, for example, as a control chip or control apparatus of the operator control device.

By the control device, a generation of a control signal which describes the determined data set and a transfer of the determined data set to the second of the display devices occurs. The generation of the control signal can here preferably occur as a function of the selected data set and/or the predetermined shifting of the virtual image. Next, a transfer of the generated control signal to the display device displaying the determined data set occurs, and as a result a change of the display plane on which the display content is visible occurs.

This results in the above-mentioned advantages. Due to such a physical moving of contents in the three-dimensional space, an operating experience is considerably increased, and new operation possibilities are enabled. In addition, display contents can be staggered intelligently. In combination with, for example, a matching remote operator control action on, for example, an arm rest pad as touch-sensitive operator control surface, a pleasant and very comfortable experience is generated for the operator. This operating concept is particularly advantageous for piloted driving motor vehicles, in which the motor vehicle seats do not necessarily have to be arranged in the conventional position in front of a steering wheel and a dashboard. In order to operate the display device, the user of the motor vehicle, that is to say the operator, does not have to position his/her motor vehicle seat in order to be able to grasp a firmly incorporated operator control element on the dashboard. The motor vehicle seat can, for example, be positioned as before in a lateral site facing an interior of the motor vehicle. Due to the design as a touch-sensitive operator control surface, numerous possibilities are generated for accommodating the operator control device in the motor vehicle, without, for example, potentially interfering buttons or switches having to be incorporated everywhere in the motor vehicle.

This also considerably increases the comfort during the operation of the display arrangement. The operator better and more intuitively feels and senses during a movement or sliding over the touch-sensitive operator control surface how the display content is shifted in the three-dimensional space. In other words, due to the synergy of operator control action and touch-sensitive operator control surface, the operating concept according to the invention improves an intuitive character of the operation.

The detection and evaluation device can acquire, as operator control action, preferably a pulling and/or shifting (away) gesture for the operation of the display arrangement, so that the user can operate the display arrangement particularly intuitively, since the pulling and/or shifting away represents the emergence of the display content into the foreground and/or the recession of the display content into the background.

Preferably, the extension direction can extend along a motor vehicle longitudinal axis. This is particularly advantageous in the case of an arrangement of the display devices which are arranged staggered with respect to the motor vehicle longitudinal axis one behind the other and thereby materialize the three-dimensional space in driving direction for the display content.

According to a development, in the case in which the detection and evaluation device determines an extension direction extending in driving direction, the control signal can describe a transfer of the determined data set to the second display surface mirrored in the first display surface. This can be provided preferably by a display arrangement in which the first display surface has a partial region which is invisible from the vehicle compartment and is arranged with respect to the second display surface in such a manner that the partial area is mirrored in the second display surface, and consequently an additional virtual display, which is visible from the passenger compartment, is generated behind the virtual display plane. The display content can thus be shifted virtually in the direction of the driving direction.

The operation of the display arrangement and thus the operator can become independent of an organization of an interior accessory of the vehicle, in case the operator control device has multiple touch-sensitive operator control surfaces distributed in the interior. A particularly large number of surfaces of the interior can thus be used as touch-sensitive operator control surface, in case, according to an additional embodiment of the method according to the invention, by the detection and evaluation device, a detection of an additional operator control action for the selection of the touch-sensitive operator control surface occurs from a plurality of touch-sensitive operator control surfaces, and carries out a detection of an activation operator control action on the basis of the acquired additional operator control action. Such an activation operator control action can be, for example, a tapping or double tapping of the touch-sensitive operator control surface. By the control device, depending on the detected activation operator control action, a selection of the touch-sensitive operator control surface from the plurality of touch-sensitive operator control surfaces can occur, and an activation of an active mode of the selected touch-sensitive operator control surface for the reception of operator control actions can occur. The activation operator control action can be acquired, for example, by means of a structurally separate sensor from the touch-sensitive operator control surface, for example, with the aid of a camera which, for example, can be arranged on a ceiling of the motor vehicle.

So that the touch-sensitive operator control surface can be integrated conveniently for the operator in the interior, for example, in an arm rest or in a door cheek, but so that an erroneous operation due to accidental resting or movement of the arm on the touch-sensitive operator control surface is reduced or prevented, it is possible, according to an additional embodiment of the method according to the invention, that, by the control device and/or the detection and evaluation device, an establishment of an acquisition pause with a predetermined time length follows, wherein the acquisition pause can describe a time period without reception of an operator control action by the touch-sensitive operator control surface, preferably by the selected touch-sensitive operator control surface. As a function of the determined acquisition pause, the control device can set a sleep mode, in which, with the aid of the touch-sensitive t, optionally of the selected touch-sensitive operator control surface, no operator control actions are detected.

The above-described aim is also achieved by an embodiment of the operator control device according to the invention, the operator control device comprising at least one touch-sensitive operator control surface and a detection and evaluation device, characterized in that the detection and evaluation device is configured to carry out the method steps involving a detection and evaluation device, according to one of the above-described embodiments of the method according to the invention.

This results in the above-mentioned advantages. Preferably, the operator control device can additionally comprise a control device which is configured to carry out the method steps involving a control device of one of the above-described embodiments of the method according to the invention. The detection and evaluation device and/or the control device can optionally each have a processor device, that is to say a component for the electronic data processing, which preferably can comprise at least one microcontroller and/or microprocessor. Optionally, in a data memory, for example, a data memory of the operator control device, a program code can be stored, which, in the case of execution by the processor device, causes the detection and evaluation device and/or the control device to carry out the respective method steps.

Preferably, the operator control device according to the invention can be characterized in that the at least one touch-sensitive operator control surface is arranged on an arm rest and/or a door cheek and/or a center console and/or is designed as a covering of an interior accessory element of the motor vehicle. This results in a particularly comfortable operation for the operator, in particular in piloted driving motor vehicles.

The above-described aim is also achieved by a motor vehicle which preferably can be designed as a car, for example, a passenger car, wherein the motor vehicle has a display arrangement which has at least two display devices each with a display surface, wherein the motor vehicle is characterized by an embodiment of the operator control device according to the invention. This results in the above-mentioned advantages.

BRIEF DESCRIPTION OF THE DRAWING

Below, embodiment examples of the invention are described. For this purpose:

FIG. 1 shows a diagrammatic representation relating to a first embodiment example of the method according to the invention and to a first embodiment example of the operator control device according to the invention; and FIG. 2 shows a diagrammatic representation relating to an additional embodiment example of the method according to the invention and to an additional embodiment example of the operator control device according to the invention.

DETAILED DESCRIPTION

The embodiment examples explained below are preferred embodiments of the invention. In the embodiment examples, the described components of the embodiments each represent individual features of the invention to be considered independently of one another, which in each case also independently of one another further develop the invention and thus are also to be considered as component of the invention individually or in another combination different from the combination shown. Moreover, the described embodiments can also be complemented by others of the already described features of the invention.

In the figures, functionally equivalent elements are in each case provided with the same reference numerals.

FIG. 1 illustrates the principle of the method according to the invention on the basis of a first embodiment example. For this purpose, FIG. 1 shows a motor vehicle 10 which can preferably be designed as a piloted motor vehicle, for example, as a piloted private car.

The motor vehicle 10 comprises a display arrangement 12 which can comprise, for example, two display devices 14, 16. Here, in the example of FIG. 1, a first of the display devices 14 can be designed, for example, as a main monitor, that is to say as a main display, and an additional display device 16 can be arranged, for example, in a dashboard 17 in such a manner that a display surface of the additional display devices 16 is not visible to a vehicle occupant. However, a display surface 18 of the first display device 14 can be visible to the vehicle occupant.

The display surface (not shown in FIG. 1) of the additional display device 16 can be mirrored, for example, in the display surface 18 of the first display device 14, whereby a virtual display plane 20 can be generated. In the example of FIG. 1, here, for example, precisely the additional display device 16 can output a data set, whereby in the virtual display plane 20 a display content 22 described by the data set can be visible in the virtual display plane 20. The display plane of the first display devices 14 can here preferably lie on the display surface 18 of the first display devices 14.

An operator control device 24 of the motor vehicle 10 has, for example, two touch-sensitive operator control surfaces 26, wherein one of the touch-sensitive operator control surfaces 26 can be arranged, for example, on a surface of a dashboard 17 and another of the touch-sensitive operator control surfaces 26 can be arranged on or in a surface of an arm rest 28. For example, the operator control surface 26 can be designed as a touchpad or as a fabric covering of an interior accessory element, that is to say, of the exemplary arm rest 28. The covering mentioned as an example can, for example, be woven from non-sensory or sensory threads. Such coverings are known to the person skilled in the art from the prior art. In principle, any surface of the interior of the motor vehicle 10 can be used here as interactive surface, that is to say as touch-sensitive operator control surface 26. Such an interior accessory element can alternatively be made, for example, of wood or leather, wherein such a covering can in each case be designed as a capacitive surface. In a similar manner as, for example, in a tablet PC, wherein a capacitive surface can be arranged under a glass plate, in the exemplary touch-sensitive operator control surface, a sensory surface, preferably a capacitive surface, can be arranged under the exemplary leather covering or the exemplary wood lining.

The operator control device 24 which, for example, can be designed as an apparatus component of an infotainment system of the motor vehicle 10, has a detection and evaluation device 30, and optionally a control device 32. Alternatively, the control device 32 can be a component of the display arrangement 12. The exemplary detection and evaluation device 30 and/or the exemplary control device 32 can be designed, for example, in each case as a circuit of a control board, or, for example, in each case as a control chip. Here, in the example of FIG. 1, both the detection and evaluation device 30 and also the control device 32 in each case have a processor device 34 and a memory device 36. The detection and evaluation device 30 can, for example, have a corresponding program code which, for example, can be stored in the memory device 36 of the detection and evaluation device 30.

As already mentioned above, in the example of FIG. 1, the display content 22 can first be visible on the virtual display plane 20, lying behind the first display device 14 in the example of FIG. 1. The display content can describe, for example, an image and/or a text relating to information relevant or interesting to the driver. A user of the motor vehicle 10, that is to say the operator, for example, may want the display content 22, for example, to be enlarged and/or may wish to see it on the front display plane, that is to say on the display surface 18 of the first display devices 14. In the example of FIG. 1, the operator has, for example, two operator control surfaces 26 available, and since the operator, for example, due to a current position of the motor vehicle, cannot sit at the dashboard 17, but can sit slightly farther to the rear of it, the operator, for example, may want to use the operator control surface 26 on the arm rest 28.

Optionally, it can be provided that the different operator control surfaces 26 are activated only as a result of a situation, so that no erroneous operation occurs in case the operator rests his/her body part 38, that is to say, for example, a hand or an arm, accidentally or intentionally on the arm rest 28. In order to activate the operator control surface 26 in the arm rest 28, for example, the sensor device 40, which can be, for example, a sensor device of the detection and evaluation device 30 and which can have, for example, a camera as sensor, can optionally acquire an activation operator control action (method step S1). For this purpose, the operator, for example, can tap with body part 38 twice on the desired operator control surface 26. A camera signal which can describe the operator control action can be generated by the sensor device 40 and be transmitted via a data communication connection 41 to the detection and evaluation device 30 (S2). Here, the data communication connection 41 can be, for example, a wired data communication connection 41, for example, a data bus of the motor vehicle 10. Alternatively, the data communication connection 41 can be a wireless data communication connection 41, for example, a Bluetooth or WLAN communication connection. In the figures, additional data communication connections 41 are shown here as black connection lines and marked with reference numeral 41.

The detection and evaluation device 30 can evaluate, for example, with the aid of corresponding software, the transmitted camera signal and acquire the activation operator control action (S3). Alternatively to the described activation operator control action, in which the body part 38, for example, can tap twice on the operator control surface 26, for example, a sensor system of the operator control surface 26 can acquire, for example, the application of a heel of the hand and the fingers of the operator. For this purpose, the detection and evaluation device 30 can acquire, with the aid of a corresponding algorithm, for example, the contours of a heel of the hand and of the fingers and thus detect that the heel of the hand is applied on the operator control surface 26 of the arm rest 28. The detection and evaluation device 30 can generate a corresponding signal which can describe the activation operator control action (S4) and transmit it to the control device 32. As a function of the signal, that is to say as a function of the activation operator control action, said control device can then select the touch-sensitive operator control surface 26 of the arm rest 28, (S5), and switch the selected touch-sensitive operator control surface 26 of the arm rest 28 into an active mode (S6).

For the shifting of the display content 22, the operator can then carry out an operator control action on the touch-sensitive operator control surface 26. In the example of FIG. 1, the body part 38 can here, for example, carry out a pulling gesture which can represent or symbolize a pulling up to the display content 22 from the virtual display plane 20 to the display plane of the exemplary main display. The exemplary pulling gesture in FIG. 1 is here illustrated as an arrow on the touch-sensitive operator control surface 26 and can be carried out preferably along a motor vehicle longitudinal axis. By means of the touch-sensitive operator control surface 26, the detection and evaluation device 30 acquires the operator control action in method step S7. For example, in the detection and evaluation device 30, an orientation and/or coordinates of the touch-sensitive operator control surface 26 can be stored, so that, on the basis of the acquired operator control action, the extension direction can also be determined (S9). Thereby, the detection and evaluation device 30 can distinguish between the pulling gesture represented in FIG. 1 and the shifting gesture represented in FIG. 2.

In the example of FIG. 1, for example, a pulling gesture can be acquired (S8). By means of such a special operator control action, the operator intuitively has performed the shifting of the display content 22 to a display plane which is closer to him/her, and, by the touch contact with the touch-sensitive operator control surface 26, the operator at the same time receives the feedback on the performed operator control action. The detection and evaluation device 30 can query, for example, in the control device 32 and the display arrangement 12, which data set is just then being output by the additional display device 16. A corresponding data set (not shown in FIG. 1) can be determined correspondingly (S10). On the basis of the determined extension direction, it can then be determined that the selected data set should be transmitted to the other of the two display devices 14, 16, that is to say, in the case of FIG. 1, to the display devices 14. (S11).

The detection and evaluation device can, for example, generate a control signal which can describe the data set and the display devices 14 as receiver of the data set (S12) and it can transmit this signal to the control device 32. Depending on this optional signal, the control device 32 can generate a control signal (S13) which can describe a corresponding instruction, and this control signal with the mentioned instruction can be transmitted to the display device 14 and/or the display arrangement 12 (S14). For example, a control apparatus or control component of the display arrangement 12 or of the display device 14, 16 can then convert the control signal, so that the data set is transferred to the first display devices 14, and thereby, from the viewpoint of the operator, the display content 22 which is then output by the first display devices 14 is shifted to the display surface 18 of the first display devices 14 (S15), so that the display content 22 then appears in the front display plane.

FIG. 2 shows the shifting of the display content 22 in the opposite direction, wherein the individual components can be those of FIG. 1, and a corresponding method for shifting (S15) the display content 22 to the other virtual display plane 20 can be transferred analogously to the method described in FIG. 1. Here, a corresponding operator control action can be, for example, a shifting gesture or shifting away gesture, in which the body part 38 can shift the display content 22 forward as viewed virtually by the operator.

If the detection and evaluation device 30 and/or the control device 32 establishes, for example, an acquisition pause of two minutes, for example, in that the touch-sensitive operator control surface 26 receives and/or acquires no touch contact for a duration of two minutes (S16), then the touch-sensitive operator control surface 26 can optionally be switched into a sleep mode (S17) via the detection and evaluation device 30 and/or the control device 32.

Optionally, it can be provided that the control device 32 can, for example, detect, for example, by means of a sensor on a vehicle door, that the operator just entered. The entering can here be interpreted, for example, as an activation operator control action, so that the touch-sensitive operator control surfaces 26, optionally all the touch-sensitive operator control surfaces 26, can be activated.

Additional exemplary functions of the touch-sensitive operator control surface 26 can be, for example, the acquisition of an operator control action for subdividing the display surfaces of the two display devices 14, 16, for example, multiple tapping on the first display devices 14. For the acquisition of such an operator control action for subdividing (S1) the display, the exemplary camera 40 can be used.

In the case of subdividing of the display surfaces for a driver and a passenger, for example, one of the display surfaces can be associated with the driver and the other with the passenger, in case, for example, two occupants are detected by means of pressure sensors in the motor vehicle. If, then, for example, one of the two persons gets out, the remaining operator can use the entire display surface 18, 20 which can extend, for example, over the entire vehicle width.

Optionally, by the detection and evaluation device 30, a minimum length of the pulling and/or shifting gesture can be predetermined as threshold value for triggering the shifting S15 of the display content 22. Alternatively, a speed of the pulling and/or shifting can be provided as threshold value for this purpose, in that the detection and evaluation device 30, for example, is configured to acquire a corresponding speed. In the case of, for example, a slow pulling and/or shifting, for example, the display content 22 can remain on the original display plane 18, 20 and merely be zoomed or reduced in size. In the case of a more rapid pulling and/or shifting, a so-called "swipe" or "flip," wherein the corresponding speed of the operator control action can exceed the threshold value, the above-described switching of the display planes 18, 20 can occur. In other words, the display content 22 can first be enlarged on the same plane before it is shifted (S15).

Overall, the embodiment examples explain how the invention provides a novel media logic in connection with physical operator control element.

According to an additional embodiment example, a remote operation can be operated on display arrangement 12, staggered, for example, in two display planes 18, 20, for example, of an infotainment system, via one or more touch-sensitive operator control surfaces 26, wherein the touch-sensitive operator control surfaces 26 can preferably be designed as sensory touchpad and, for example, be arranged in each case in a door cheek. Here, infotainment contents staggered, for example, onto the two display planes 18, 20, can be operated preferably by a pulling and/or a shifting away gesture or by pulling and/or pushing away gestures on the exemplary interactive touchpad in the exemplary door cheek or arm rest.

The operating logic is based on a mental model which is easy to understand for the operator, in which the operator preferably can "pull" by means of a pulling gesture the display content 22, the infotainment content, for example, directly from the rear display plane 20 to the front display plane 18. When the operator would like to fade out a display content 22 or pause current displays, he/she can "physically" move the display content 22 or multiple display contents 22 to the rear, for example, by a shifting away gesture. Thus, a direct analogy is generated between the remote operator control action and the movement of display content 22 over two display planes 18, 20 (see FIG. 1 and FIG. 2).

The exemplary interactive touch surfaces in the exemplary arm rests can be spread over an entire surface of the exemplary arm rest, so that the operator can comfortably operate in any seated position.

The display arrangement 12 can here have, for example, a display arrangement 12, already described above, with two display devices 14, 16, wherein a second of the two display devices 16 can be mirrored in the first display devices 14. In addition, a touch-sensitive operator control surface 26 or multiple touch-sensitive operator control surfaces 26 can be incorporated, for example, in arm rests, which, for example, activate both display planes 18, 20 and/or enable an interaction between the two display planes 18, 20.

FIG. 1 and FIG. 2 here show a preferred operating scheme. The touch-sensitive operator control surface 26 can be designed, for example, as an interactive touchpad which can be spread out, for example, over an entire arm rest and which selects and/or actuates the display content 22 by, for example, "pulling it up." Thus, the element, that is to say the display content 22, can be moved in the three-dimensional space onto the front display plane 18.

FIG. 2 shows an exemplary pausing or rejecting or discarding of the display content 22 or multiple display contents 22 by, for example, "wiping away." Thus, the element, that is to say the display content 22, can be moved in the three-dimensional space onto the rear display plane 20.

The invention claimed is:

1. A method for operating a motor vehicle which comprises:
   - a first display device having a first display surface, wherein the first display device is configured to provide a front display plane, and
   - a second display device having a second display surface, wherein the second display surface is mirrored in the first display surface, thereby producing a virtual display plane behind the front display plane, the method comprising:
   - acquiring, by an operator control device, an operator control action of an operator, wherein the operator control action comprises a movement of a body part of the operator along an extension direction of a touch-sensitive operator control surface of the operator control device;
   - determining, based on the acquired operator control action, the extension direction on the touch-sensitive operator control surface; and
   - determining, based on the determined extension direction, a data set selected by the operator by the operator control action and displayed as content on either the front display plane or the virtual display plane;
   - determining a shift of the content, based on the extension direction of the operator control action, between the front display plane and the virtual display plane;
   - generating a control signal which describes the determined data set and a transfer of the determined data set to a selected display device of the first display device and the second display device; and
   - transferring the generated control signal to the selected display device, thereby shifting the content between the front display plane and the virtual display plane.

2. The method according to claim 1, further comprising:
   - acquiring, by a detection and evaluation device of the operator control device, a pulling and/or shifting away gesture as the operator control action.

3. The method according to claim 1, wherein the extension direction extends along a longitudinal axis of the motor vehicle.

4. The method according to claim 3, further comprising:
determining, by a detection and evaluation device of the operator control device, that the extension direction along the longitudinal axis is opposite to a driving direction of the motor vehicle; and
shifting the content from the virtual display plane to the front display plane.

5. The method of claim 3, further comprising:
determining, by a detection and evaluation device of the operator control device, that the extension direction along the longitudinal axis is aligned with a driving direction of the motor vehicle; and
shifting the content from the front display plane to the virtual display plane.

6. The method according to claim 1, further comprising:
acquiring an additional operator control action for the selecting of the touch sensitive operator control surface; and
detecting, based on the acquired additional operator control action, an activation operator control action;
selecting, by the operator control device as a function of the detected activation operator control action, the touch-sensitive operator control surface from a plurality of touch-sensitive operator control surfaces; and
activating an active mode of the selected touch-sensitive operator control surface for the acquisition of operator control actions.

7. The method according to claim 1, further comprising:
establishing an acquisition pause with a predetermined time length, wherein the acquisition pause describes a time period without reception of the operator control action by the touch-sensitive operator control surface; and
setting, as a function of the established acquisition pause, a sleep mode, in which no operator control actions with the aid of the touch-sensitive operator control surface are detected.

8. The method of claim 1, wherein the virtual display plane is visible from a passenger compartment of the motor vehicle.

9. The method of claim 1, wherein the virtual display plane is not visible from a passenger compartment of the motor vehicle.

10. An operator control device, comprising:
at least one touch-sensitive operator control surface; and
a detection and evaluation device, wherein the detection and evaluation device is configured to:
acquire an operator control action of an operator of a motor vehicle, wherein the operator control action comprises a movement of a body part of the operator along an extension direction of a touch-sensitive operator control surface of the operator control device,
determine, based on the acquired operator control action, the extension direction on the touch-sensitive operator control surface,
determine, based on the determined extension direction, a data set selected by the operator by the operator control action and displayed as content on either a front display plane or a virtual display plane,
determine a shift of the content, based on the extension direction of the operator control action, between the front display plane and the virtual display plane,
generate a control signal which describes the determined data set and a transfer of the determined data set to a selected display device of a first display device and a second display device, and
transfer the generated control signal to the selected display device, thereby shifting the content between the front display plane and the virtual display plane.

11. The operator control device according to claim 10, wherein the at least one touch-sensitive operator control surface is arranged on an arm rest and/or a door cheek and/or a center console and/or is designed as a covering of an interior accessory element of the motor vehicle.

12. A motor vehicle comprising:
a first display device having a first display surface, wherein the first display device is configured to provide a front display plane;
a second display device having a second display surface, wherein the second display surface is mirrored in the first display surface, thereby producing a virtual display plane behind the first display plane; and
an operator control device that is configured to:
acquire an operator control action of an operator, wherein the operator control action comprises a movement of a body part of the operator along an extension direction of a touch-sensitive operator control surface of the operator control device,
determine, based on the acquired operator control action, the extension direction on the touch-sensitive operator control surface,
determine, based on the determined extension direction, a data set selected by the operator by the operator control action and displayed as content on either the front display plane or the virtual display plane,
determine a shift of the content, based on the extension direction of the operator control action, between the front display plane and the virtual display plane,
generate a control signal which describes the determined data set and a transfer of the determined data set to a selected display device of the first display device and the second display device, and
transfer the generated control signal to the selected display device, thereby shifting the content between the front display plane and the virtual display plane.

* * * * *